US010231004B2

(12) United States Patent
Codavalli

(10) Patent No.: US 10,231,004 B2
(45) Date of Patent: Mar. 12, 2019

(54) NETWORK RECORDING SERVICE

(75) Inventor: Rajnikanth Codavalli, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1245 days.

(21) Appl. No.: 13/528,268

(22) Filed: Jun. 20, 2012

(65) Prior Publication Data
US 2013/0346541 A1 Dec. 26, 2013

(51) Int. Cl.
*H04N 21/2747* (2011.01)
*H04L 29/08* (2006.01)
*H04N 21/231* (2011.01)

(52) U.S. Cl.
CPC ..... *H04N 21/2747* (2013.01); *H04L 67/2828* (2013.01); *H04N 21/23106* (2013.01)

(58) Field of Classification Search
CPC ............... H04L 12/1831; H04N 21/440263
USPC .................................................. 709/234
See application file for complete search history.

(56) References Cited

U.S. PATENT DOCUMENTS

| | | | |
|---|---|---|---|
| 6,564,380 B1 * | 5/2003 | Murphy | H04N 7/147 348/207.11 |
| 6,674,459 B2 | 1/2004 | Ben-Shachar et al. | |
| 8,060,631 B2 * | 11/2011 | Collart | G06F 17/30017 709/228 |
| 8,582,946 B2 * | 11/2013 | Craner | H04N 5/44543 386/200 |
| 8,782,262 B2 * | 7/2014 | Collart | G06F 17/30017 709/228 |
| 8,880,714 B2 * | 11/2014 | Collart | G06F 17/30017 709/228 |
| 2002/0184638 A1 * | 12/2002 | Agnihotri et al. | 725/89 |
| 2003/0194968 A1 * | 10/2003 | Young | H04H 20/61 455/45 |
| 2004/0024867 A1 * | 2/2004 | Kjellberg | 709/224 |
| 2004/0080504 A1 * | 4/2004 | Salesky | H04L 12/1813 345/418 |

(Continued)

FOREIGN PATENT DOCUMENTS

FR 2931330 A1 * 11/2009 ......... H04L 12/1831

OTHER PUBLICATIONS

Maricopa Association of Governments. "Videoconference Training Guide." Phoenix, Arizona: Jul. 2002. 87 pages.*

(Continued)

*Primary Examiner* — Oscar Louie
*Assistant Examiner* — Benjamin A Jenkins
(74) *Attorney, Agent, or Firm* — Kilpatrick Townsend & Stockton LLP

(57) ABSTRACT

One embodiment includes a recording application executed at a processor on a server. The recording application receives a request to record electronic content. The request is received from a client device via a first network connection between the server and the client device. A second network connection between a content provider and the client is used to provide the electronic content from the content provider to the client device. In response to receiving the request, the recording application establishes a third network connection between the server and the content provider. The recording application stores the electronic content provided via the third network connection. The electronic content is stored to a computer-readable medium.

20 Claims, 4 Drawing Sheets

(56) References Cited

U.S. PATENT DOCUMENTS

| | | | |
|---|---|---|---|
| 2004/0165783 A1* | 8/2004 | Reynolds | H04L 29/06 382/239 |
| 2004/0187152 A1* | 9/2004 | Francis et al. | 725/58 |
| 2005/0050578 A1* | 3/2005 | Ryal | 725/143 |
| 2005/0102698 A1* | 5/2005 | Bumgardner et al. | 725/80 |
| 2005/0183120 A1* | 8/2005 | Jain et al. | 725/46 |
| 2006/0089820 A1* | 4/2006 | Yu et al. | 702/186 |
| 2007/0104456 A1* | 5/2007 | Craner | H04N 5/44543 386/291 |
| 2008/0008458 A1* | 1/2008 | Gudipaty | G11B 27/034 386/240 |
| 2008/0065883 A1* | 3/2008 | Zeng et al. | 713/168 |
| 2008/0069207 A1* | 3/2008 | Reynolds | H04L 29/06 375/240.01 |
| 2008/0165895 A1* | 7/2008 | Lesser et al. | 375/316 |
| 2009/0010610 A1* | 1/2009 | Scholl et al. | 386/68 |
| 2009/0150553 A1* | 6/2009 | Collart | G06F 17/30017 709/229 |
| 2010/0005483 A1* | 1/2010 | Rao | 725/25 |
| 2010/0042235 A1* | 2/2010 | Basso et al. | 700/94 |
| 2010/0088414 A1* | 4/2010 | Lin | H04L 63/102 709/227 |
| 2010/0313229 A1 | 12/2010 | Martini | |
| 2011/0061086 A1* | 3/2011 | Huang | 725/110 |
| 2011/0113122 A1* | 5/2011 | Drope | G06F 17/30017 709/219 |
| 2011/0161654 A1 | 6/2011 | Margolis et al. | |
| 2011/0261149 A1* | 10/2011 | Anuar | H04N 7/15 348/14.08 |
| 2011/0271213 A1 | 11/2011 | Newman et al. | |
| 2012/0030366 A1* | 2/2012 | Collart | G06F 17/30017 709/229 |
| 2012/0134652 A1* | 5/2012 | Bhogul et al. | 386/299 |
| 2012/0198508 A1* | 8/2012 | Kuo | 725/110 |
| 2012/0219058 A1* | 8/2012 | Reynolds | H04L 29/06 375/240.03 |
| 2012/0284765 A1* | 11/2012 | Killick et al. | 725/111 |
| 2013/0024901 A1* | 1/2013 | Sharif-Ahmadi et al. | 725/114 |
| 2013/0235929 A1* | 9/2013 | Reynolds | H04L 29/06 375/240.03 |
| 2014/0037270 A1* | 2/2014 | Craner | H04N 5/44543 386/295 |
| 2014/0089515 A1* | 3/2014 | Collart | G06F 17/30017 709/229 |

OTHER PUBLICATIONS

Machine translation of "Description" section in French application publication 2 931 330. Original published Nov. 20, 2009. Machine translation performed Feb. 11, 2016. 7 pages.*

Cloud-Based Mobile Reference Apps Enhance Video Capture, Preserve Quality and Streamline Workflows, dated Jul. 12, 2011, available at http://new.blog.sorensonmedia.com/2011/07/cloud-based-mobile-reference-apps-enhance-video-capture-preserve-quality-and-streamline-workflows/, 2 pages.

* cited by examiner

NETWORK RECORDING SERVICE

TECHNICAL FIELD

This disclosure relates generally to computer-implemented methods and systems and more particularly relates to network recording services.

BACKGROUND

Online content providers can provide electronic content to computing devices via the internet. The term "electronic content" refers to any type of media that can be displayed on mobile and other computing devices. Computing devices include devices such as desktop computers, laptop computers, smart phones, tablet computers, personal digital assistants, etc. Electronic content can include text or multimedia hosted on websites, such as standard web pages or mobile web pages specifically formatted for display on computing devices. Electronic content can also include application software developed for computing devices that is designed to perform one or more specific tasks at the computing device.

Online content providers, such as video management services, can provide access to electronic content. Online content providers can require subscribers to create and encode electronic content, such as audiovisual content, and upload the electronic content to the online content provider. Such online content providers do not provide the capability of creating and encoding electronic content from scratch. Creating and encoding electronic content may involve using the computing resources of the client device, such as processing cycles of a graphics processing unit ("GPU") or a central processing unit ("CPU").

Using computing resources of the client device can present challenges, particularly with respect to mobile devices, such as smart phones or personal digital assistants. Mobile devices may have fewer processing and memory resources available to create and encode electronic content as compared to a desktop computer creating and encoding the same electronic content. Using computing resources of a client device, such as a mobile device, to create and encode electronic content can degrade the responsiveness or other performance of the client device.

SUMMARY

One embodiment is a recording application executed at a processor on a server. The recording application receives a request to record electronic content. The request is received from a client device via a first network connection between the server and the client device. A second network connection between a content provider and the client is used to provide the electronic content from the content provider to the client device. In response to receiving the request, the recording application establishes a third network connection between the server and the content provider. The recording application stores the electronic content provided via the third network connection. The electronic content is stored to a computer-readable medium.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
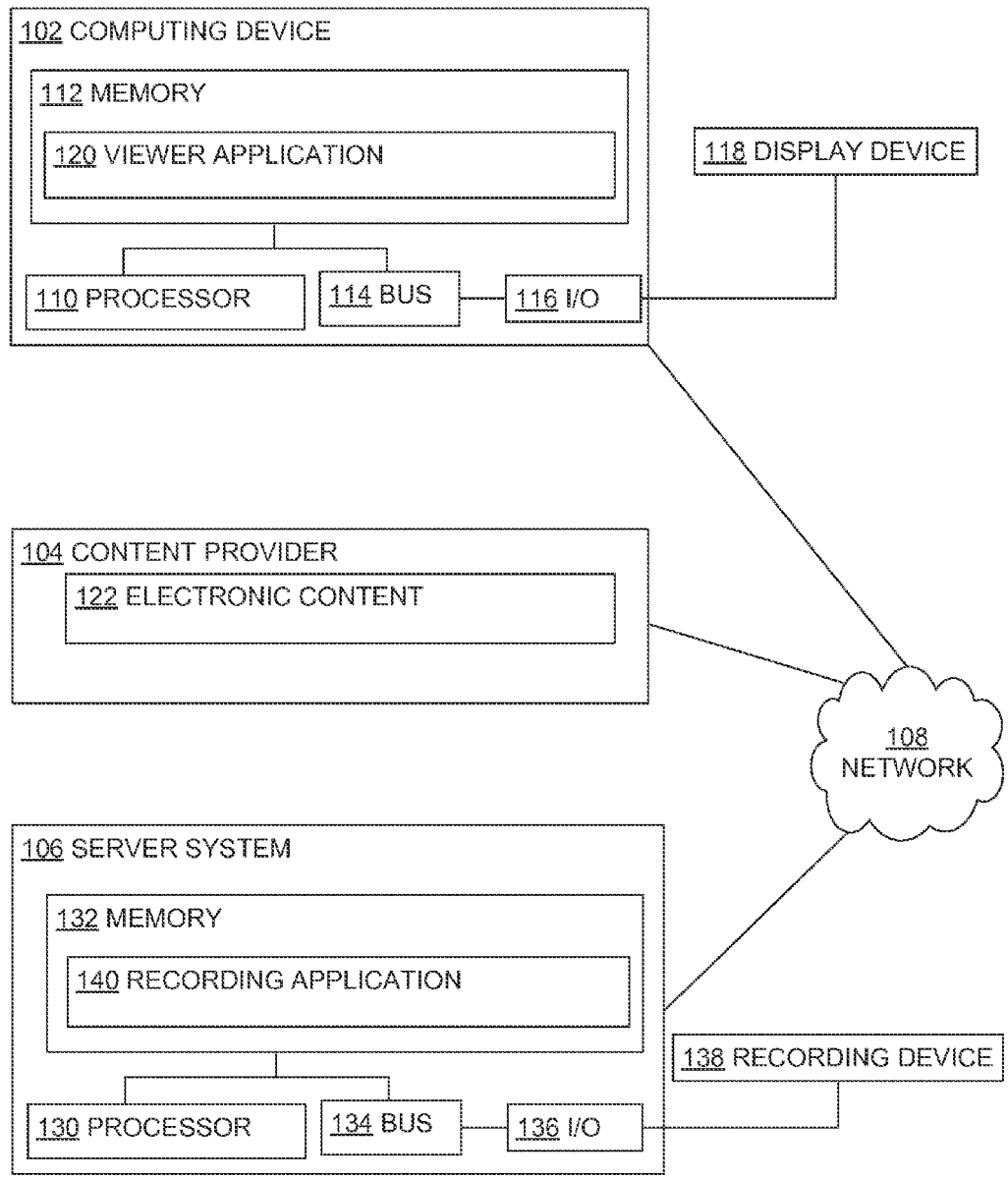
FIG. 1 is a block diagram depicting exemplary computing systems for implementing certain embodiments.

Computer-implemented systems and methods are disclosed for providing a network recording service. A network recording service can allow a client device to request a second computing system having more computing resources than the client device to access a content provider via a data network and store electronic content from the content provider. The electronic content can be encoded and stored using the computing resources of the second computing system rather than the client device. Thus, client devices having limited computing resources, such as processing capability or memory capacity, can cause electronic content to be encoded and stored without using the computing resources of the client device.

In an exemplary embodiment, the network recording service can be implemented by a recording application executed at a server. The recording application can receive a request to record electronic content. The request can be received from a client device via a first network connection between the server and the client device. The content provider can, but need not, provide the electronic content to client via a second network connection. In response to receiving the request, the recording application can establish a third network connection between the server and the content provider. The content provider can provide the electronic content to the recording application via the third network connection. The recording application can configure the server to store the electronic content provided via the third network connection. The electronic content can be stored to a computer-readable medium.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application can access data packets addressed to the port.

In additional or alternative embodiments, the network connection between the server and the content provider can be established between a first network domain at which the server is located and a second network domain at which the content provider is located. The electronic content can be provided via the network connection between the server and the content provider without routing the electronic content through the client device. For example, data packets including the electronic content can include a network address to a port of the server rather than a network address to a port of the client device.

As used herein, the term "network domain" refers to a logical group of devices connected to a computer network. The logical group can be used to identify the device in various forms of electronic communication such as the Internet, e-mail, etc.

In additional or alternative embodiments, one or more of the network connections between the client device, the server, and the content provider can be a secured network connection.

As used herein, the term "secured network connection" refers to a communication channel of a data network established using one or more network security protocols. A non-secured network connection can include a communication channel of a data network allowing non-encrypted or otherwise unsecured data to be transmitted between a computing systems communicating via the network.

As used herein, the term "network security protocol" refers to a protocol for preventing unauthorized access to data communicated via a network. A security protocol can include any algorithms or group of algorithms for transforming data so as to make the data unreadable to any entity not having one or more cryptography keys for transforming the unreadable data into a readable format, to provide one or more integrity checks using a cryptographic key to validate the integrity, to provide a group identity that can use a cryptographic key to validate the source of the data originating from a group member, and/or to provide proof of origin such that a cryptographic key can be used to validate the source of a message. Examples of security protocols include, but are not limited to, Transport Layer Security ("TLS"), Secure Sockets Layer ("SSL"), Advanced Encryption Standard ("AES"), Data Encryption Standard ("DES"), Hash-based Message Authentication Code ("HMAC"), elliptical curve cryptography ("ECC"), etc.

In additional or alternative embodiments, a request can include authentication information associated with the client device. Authentication information such as a cookie or other hardware identifier can be associated with the client device. Authentication information such as a password or identification code can be associated with an operator of the client device. Establishing the network connection between the server and the content provider can include the server extracting the authentication information from the request and communicating the authentication information to the content provider.

In additional or alternative embodiments, the request can include capability data from the client device. The capability data can describe the processing capabilities of the client device. Processing capabilities can include (but are not limited to), the power or availability of a processor included in the client device, the capacity of a memory unit included in the client device, the bandwidth of a network connection between the client device and the content provider, and the like. The capability data can be generated at the computing device by one or more software modules analyzing the processing capabilities of the client device. The recording application can establish a network connection to the content provider based on determining from the capability data that the processing capabilities of the client device are insufficient to store some or all of the electronic content or that the processing capabilities of the server exceed the processing capabilities of the client device.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a block diagram depicting exemplary computing systems for implementing certain embodiments. The exemplary computing systems include a computing device 102, a content provider 104, and a server system 106 in communication via a network 108.

The computing device 102 comprises a computer-readable medium such as a processor 110 communicatively coupled to a memory 112 that executes computer-executable program instructions and/or accesses information stored in the memory 112. The processor 110 may comprise a microprocessor, an application-specific integrated circuit ("ASIC"), a state machine, or other processor. The processor 110 can include any of a number of computer processing devices, including one. Such a processor can include or may be in communication with a computer-readable medium. The computer-readable medium stores instructions that when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing device 102 may also comprise a number of external or internal devices such as a mouse, a CD-ROM, DVD, a keyboard, a display, audio speakers, one or more microphones, or any other input or output devices. For example, the computing device 102 is shown with an input/output ("I/O") interface 116 and a display device 118. A bus 114 can be respectively included in the computing device 102. The bus 114 can communicatively couple one or more components of the computing device 102.

FIG. 1 also illustrates the viewer application 120 comprised in the memory 112 of the computing device 102. The viewer application 120 can include one or more software modules. The viewer application 120 can configure the processor 110 to retrieve electronic content 122 provided by the content provider 104 via the network 108. The viewer application 120 can configure the processor 110 to render the electronic content 122 for display at the display device 118.

The computing device 102 can include any suitable client device for communicating via a network 108 and executing the viewer application 120. Non-limiting examples of a computing device include a desktop computer, a tablet computer, a smart phone, or any other computing device suitable for rendering electronic content.

The content provider 104 can provide electronic content 122 via the network 108. As is known to one of skill in the art, such electronic content 122 may be resident in any suitable computer-readable medium and execute on any suitable processor. In one embodiment, the electronic content 122 can reside in memory at the content provider 104. In another embodiment, the electronic content 122 can be accessed by the content provider 104 from a remote location via the network 108 and provided to the computing device 102 and the server system 106.

The content provider 104 can include any suitable computing system for hosting the electronic content 122. In one embodiment, the content provider 104 may be a single computing system. In another embodiment, the content provider 104 may be a virtual server implemented using a number of computing systems connected in a grid or cloud computing topology.

The server system 106 comprises a computer-readable medium such as a processor 130 communicatively coupled to a memory 132 that executes computer-executable program instructions and/or accesses information stored in the memory 132. The processor 130 may comprise a microprocessor, an ASIC, a state machine, or other processor. The processor 130 can include any of a number of computer processing devices, including one. Such a processor can include or may be in communication with a computer-readable medium storing instructions that, when executed by the processor 130, cause the processor to perform the steps described herein.

The server system 106 may also comprise a number of external or internal devices such as input or output devices. For example, the server system 106 is shown with an input/output ("I/O") interface 136 and a recording device 138, such as a video camera. The recording application 140 can configure the server system 106 to operate the recording device 138 in response to a request received by the viewer application 120. A bus 134 can be respectively included in the server system 106. The bus 134 can communicatively couple one or more components of the server system 106.

FIG. 1 also illustrates the recording application 140 comprised in the memory 132 of the server system 106. The recording application 140 can include one or more software modules. The recording application 140 can configure the processor 130 to establish a network connection to the content provider 104 via the network 108. The recording application 140 can configure the processor 130 to retrieve electronic content 122 provided by the content provider 104 via the network 108. The recording application 140 can configure the processor 130 to store some or all of the electronic content 122 in the memory 132 or any other suitable computer-readable medium.

The server system 106 can include any suitable computing system for hosting the recording application 140. In one embodiment, the server system 106 may be a single computing system. In another embodiment, the server system 106 may be a virtual server implemented using a number of computing systems connected in a grid or cloud computing topology.

Figure 2:
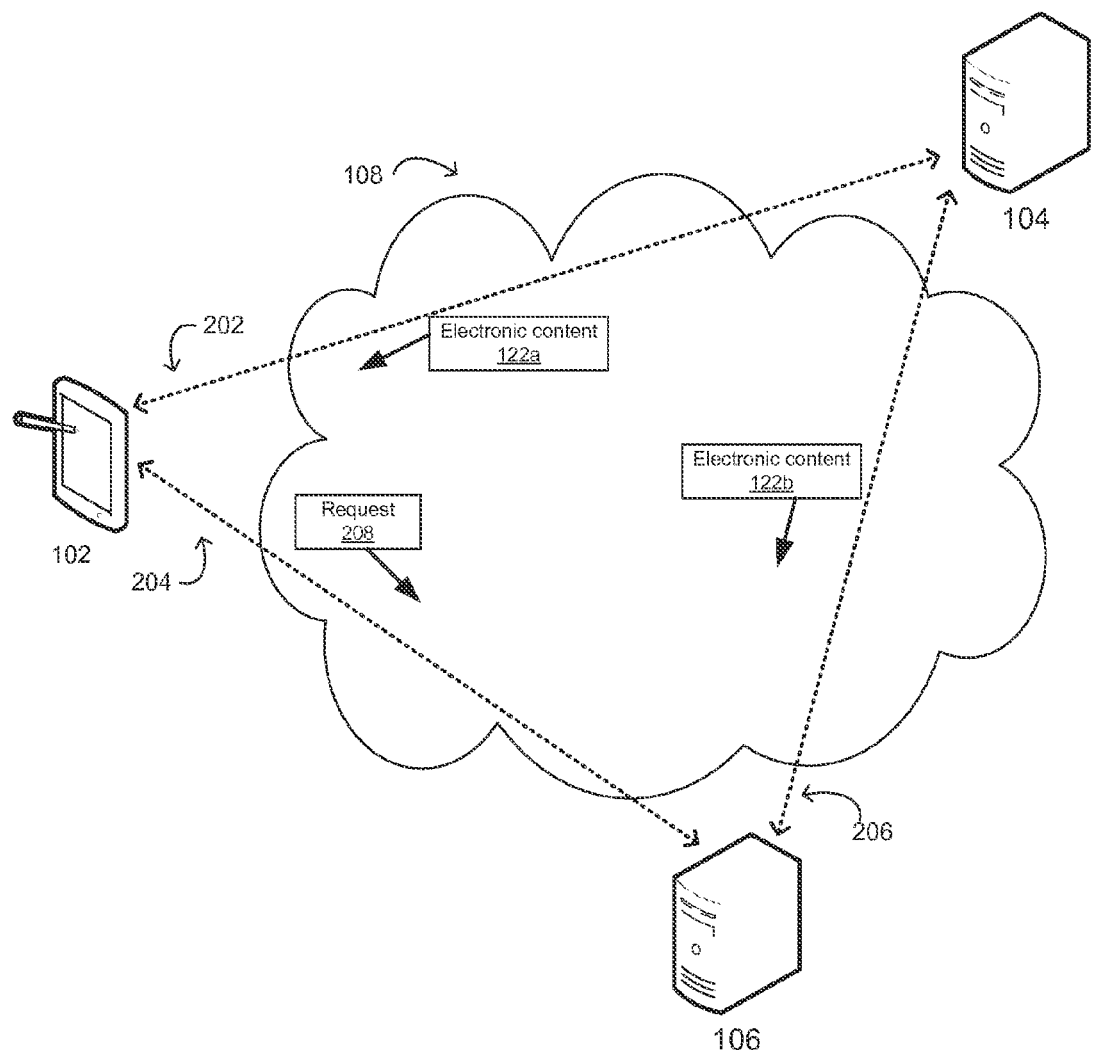
FIG. 2 is a modeling diagram illustrating an example flow of communications for a network recording service.

The recording application 140 can be executed at the server system 106 to provide a network recording service for use by the computing device 102. FIG. 2 is a modeling diagram illustrating an example flow of communications for a network recording service.

In some embodiments, one or more of the computing device 102, the content provider 104, and the server system 106 can be included in a common network domain. In another embodiment, the content provider 104, and the server system 106 can be included in different network domains.

The computing device 102 can establish a network connection 202 with the content provider 104. The viewer application 120 or another application can be executed at the computing device 102 to establish the network connection 202. The computing device 102, such as a tablet computer, can receive electronic content 122a from the content provider 104 via the network connection 202.

For example, a viewer application 120 can be an internet browser application. A web conference can be established by the browser application via network connection 202 between a computing device 102 and a content provider 104. The web conference can include the content provider 104 providing electronic content 122a, such as audio content, video content, text content, and the like to the computing device 102.

The computing device 102 can establish a network connection 204 with the server system 106. The viewer application 120 or another application can be executed at the computing device 102 and the recording application 140 can be executed at the server system 106 to establish the network connection 204.

The network connection 204 can be used to communicate packetized data from the computing device 102 to the server system 106 without routing the packetized data through the content provider 104. The network connection 204 can also be used to communicate packetized data from the computing device 102 to the server system 106 without routing the packetized data through another device or system included in the same network domain as the content provider 104.

The computing device 102 can provide a request 208 to the server system 106 via the network connection 204. The viewer application 120 executed at the computing device 102 can generate the request 208. The recording application 140 executed at the server system 106 can receive the request 208.

The server system 106 can establish a network connection 206 with the content provider 104. The recording application 140 can be executed at the server system 106 to establish the network connection 206.

The network connection 206 can be used to communicate packetized data from the content provider 104 to the server system 106 without routing the packetized data through the computing device 102. The network connection 206 can also be used to communicate packetized data from the content provider 104 to the server system 106 without routing the packetized data through another device or system included in the same network domain as the computing device 102.

The content provider 104 can provide the electronic content 122b to the server system 106 via the network connection 206. In one embodiment, the electronic content 122b can be identical to the electronic content 122a provided for display at the computing device 102.

In additional or alternative embodiments, the network connection 202 between the computing device 102 and the content provider 104 can be omitted. The computing device 102 can provide a request 208 to the server system 106 to establish a network connection 206 for retrieving and storing the electronic content 122b without the computing device 102 establishing a network connection to the content provider 104. For example, a client computing device 102 can provide a request 208 to the server system 106 to access and record electronic content 122b, such as a seminar provided via the internet. The server system 106 can access and record the internet seminar provided by a content provider 104.

In one embodiments, one or more of the network connections 202, 204, 206 can be a secured network connection. A secured network connection can include a connection established using a security protocol, such as TLS and SSL. Communicating via a secured network connection can involve encrypting the request 208 using encryption protocols such as AES, DES, HMAC, ECC, etc. In another embodiment, one or more of the network connections 202, 204, 206 can be a non-secured network connection.

In additional or alternative embodiments, the electronic content 122b can include electronic content 122a provided by the content provider 104 to the computing device 102 and data representing one or more interactions by the computing device 102 with the electronic content 122a. For example, a content provider 104 that is an online shopping service can provide electronic content 122a that include one or more menus or product descriptions. A computing device 102 can access the online shopping service. The computing device 102 can receive input via the viewer application 120, such as accessing different menus or products of the online shopping service, and communicate data representing the input to the content provider 104. A recording application 140 executed at the server system 106 can receive a request to record or otherwise capture both the electronic content 122a, such as the menus and products rendered for display at the computing device 102, and data representing interaction with the electronic content 122a via the viewer application 120. The recording application 140 can establish a network connection 206 with the content provider 104. The content provider 104 can provide electronic content 122b that includes both the electronic content 122a and the data representing interaction with the electronic content 122a.

Figure 3:
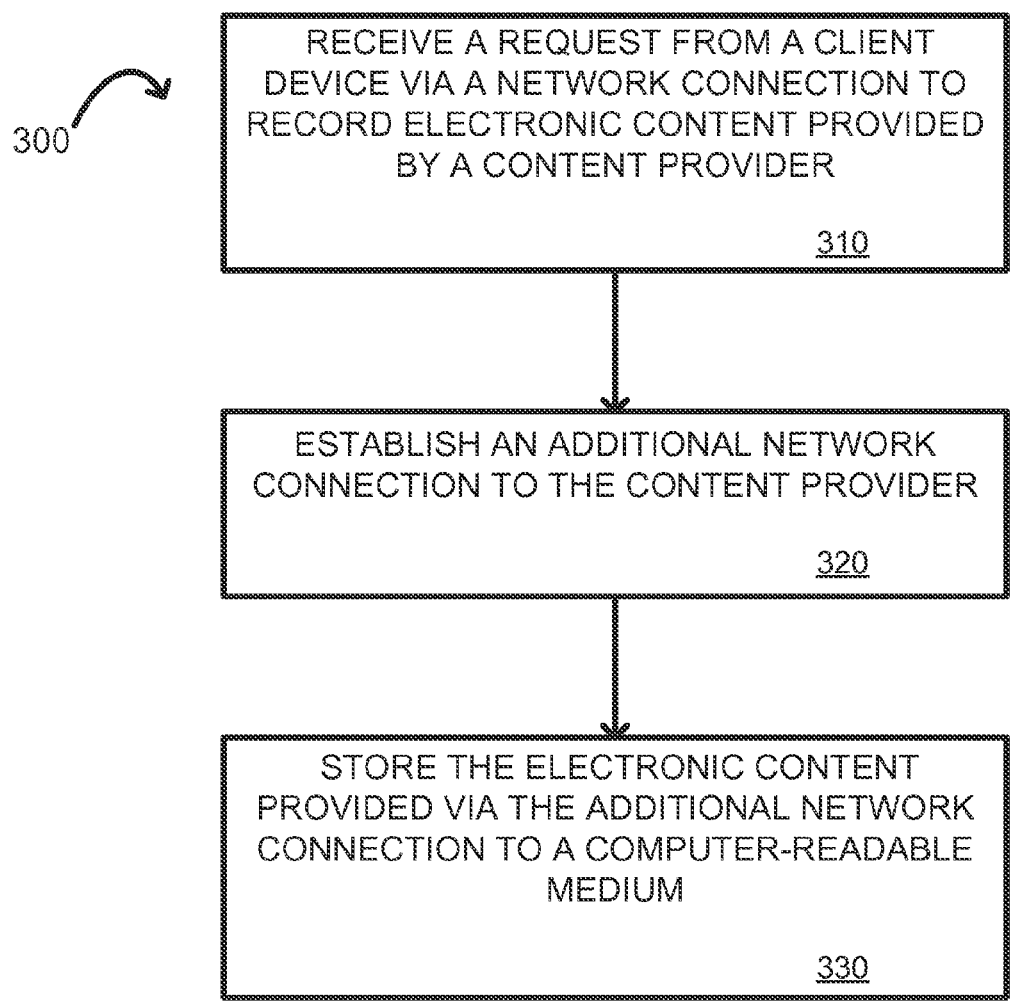
FIG. 3 is a flow chart illustrating an exemplary method for recording electronic content by a network recording service.

The recording application 140 can be executed at the server system 106 to record or otherwise store some or all of the electronic content 122b. FIG. 3 is a flow chart illustrating an example method 300 for recording electronic content 122 by a network recording service. For illustrative purposes, the method 300 is described with reference to the system implementations depicted in FIGS. 1-2. Other implementations, however, are possible.

The method 300 involves receiving a request 208 from a client device, such as a computing device 102, via the network connection 204 to record electronic content 122 provided by the content provider 104, as shown in block 310. The viewer application 120 or other application executed at the computing device 102 can generate the request 208 and provide the request to the recording application 140 executed at the server system 106.

The request 208 can include information identifying the source of the electronic content 122. For example, a request 208 can include a uniform resource locator ("URL") identifying the location of a content provider 104 that is an Internet resource. The request 208 can also include information describing the electronic content 122 to be recorded. Such information can include an identifier for the electronic content 122, a type of electronic content 122, a time at which the recording application 140 should commence and/or cease recording the electronic content 122, a duration of the recording, a file format or other encoding specifications, etc.

In additional or alternative embodiments, the request 208 can include authentication information. Authentication information can be associated with the computing device 102. An example of authentication information associated with the computing device 102 can include a cookie or other data identifying the computing device 102. Authentication information can additionally or alternatively be associated with an account or other profile corresponding to an operator of a client device and accessible by the content provider 104. For example, a content provider 104 may access an account having a user name and password. A request 208 can include the user name and password.

In additional or alternative embodiments, the request 208 can include capability data from the computing device 102. The capability data can describe the processing capabilities of the computing device 102. The processing capabilities of the computing device can include any hardware or software characteristics of the computing device 102 and/or applications executed at the computing device 102 that limit or otherwise affect storing, accessing, or otherwise using the electronic content 122 by the computing device 102. Examples of the processing capabilities can include (but are not limited to), the power or availability of the processor 110, the capacity of the memory 112, the bandwidth or speed of the network connection 202, etc. The capability data can be generated at the computing device 102 by one or more software modules analyzing the capabilities of the computing device 102. The one or more software modules can be included in any of the viewer application 120, a plug-in to the viewer application 120, or another application executed at the computing device 102.

The method 300 further involves establishing an additional network connection to the content provider 104, as shown in block 320. The recording application 140 can be executed at the server system 106 to establish the network connection 206.

In one embodiment, establishing the network connection 206 can include establishing a secured network connection between the content provider 104 and the server system 106. Establishing the network connection 206 can include the recording application 140 transmitting authentication information included in the request 208 to the content provider 104. The content provider 104 can compare or otherwise analyze the authentication information transmitted by the recording application 140 with information regarding the client device or an account accessible by the content provider 104. The content provider can determine that the recording application 140 is authorized to access the electronic content 122 based on the comparison or analysis of the authentication information.

In another embodiment, establishing the network connection 206 can include establishing a non-secured network connection between the content provider 104 and the server system 106.

In additional or alternative embodiments, the content provider 104 can determine, based on the authentication information, one or more permissions controlling how the recording application 140 can use the electronic content 122. For example, the authentication information may include subscription information associated with an account specifying that a subset of the electronic content 122 cannot be accessed or recorded by the recording application 140.

In additional or alternative embodiments, the recording application 140 can determine that the processing capabilities of the computing device 102 are insufficient to store or otherwise access and use the electronic content 122a. The recording application 140 can determine the processing capabilities of the computing device 102 based on capability data included in the request 208. The recording application 140 can establish the network connection 206 based on determining the capabilities of the computing device 102 are insufficient to store or otherwise access and use the electronic content 122a.

The recording application 140 can additionally or alternatively establish the network connection 206 based on determining that the capabilities of the system 106 exceed the capabilities of the computing device 102. The recording application 140 can establish the network connection 206 based on one or more capabilities of the system 106, such as (but not limited to), the processing speed of the processor 130, the capacity of the memory 132, the bandwidth of the network connection 206, etc. For example, a recording application 140 may determine from the capability data that a network connection 202 between the computing device 102 and the content provider 104 has a bandwidth that is less than a bandwidth of a network connection 206 between the system 106 and the content provider 104. The recording application 140 may establish the network connection 206 based on the system 106 having greater bandwidth for retrieving the electronic content 122b.

In additional or alternative embodiments, establishing the network connection 206 can include the server system 106 establishing a network connection 206 to a content provider 104 that is a computing system for controlling one or more recording devices. For example, the content provider 104 can control or otherwise access and use one or more video cameras configured to record one or more events occurring in a geographical area, such as a sporting event hosted in a stadium. The request 208 can identify the geographical area, the time at which the event will commence, and the duration of the event. The recording application 140 can configure server system 106 to establish a network connection 206 to the content provider 104. The recording application 140 can communicate a request to the content provider 104 to configure the one or more recording devices to record the event and transmit the recorded data to the recording application 140.

The method 300 further involves storing the electronic content 122b provided via the network connection 206 to a computer-readable medium, as shown in block 330. The recording application 140 can configure the server system 106 to store some or all of the electronic content 122b. In one embodiment, the electronic content 122b can be stored to the memory 132. In another embodiment, the recording application 140 can configure the server system 106 to store the electronic content 122b to a non-transitory computer-readable medium accessible by the server system 106 via the network 108. The recording application 140 can thus use the hardware resources of the server system 106 to record the electronic content 122b without the computing device 102 executing any processes associated with storing the electronic content 122a.

Figure 4:
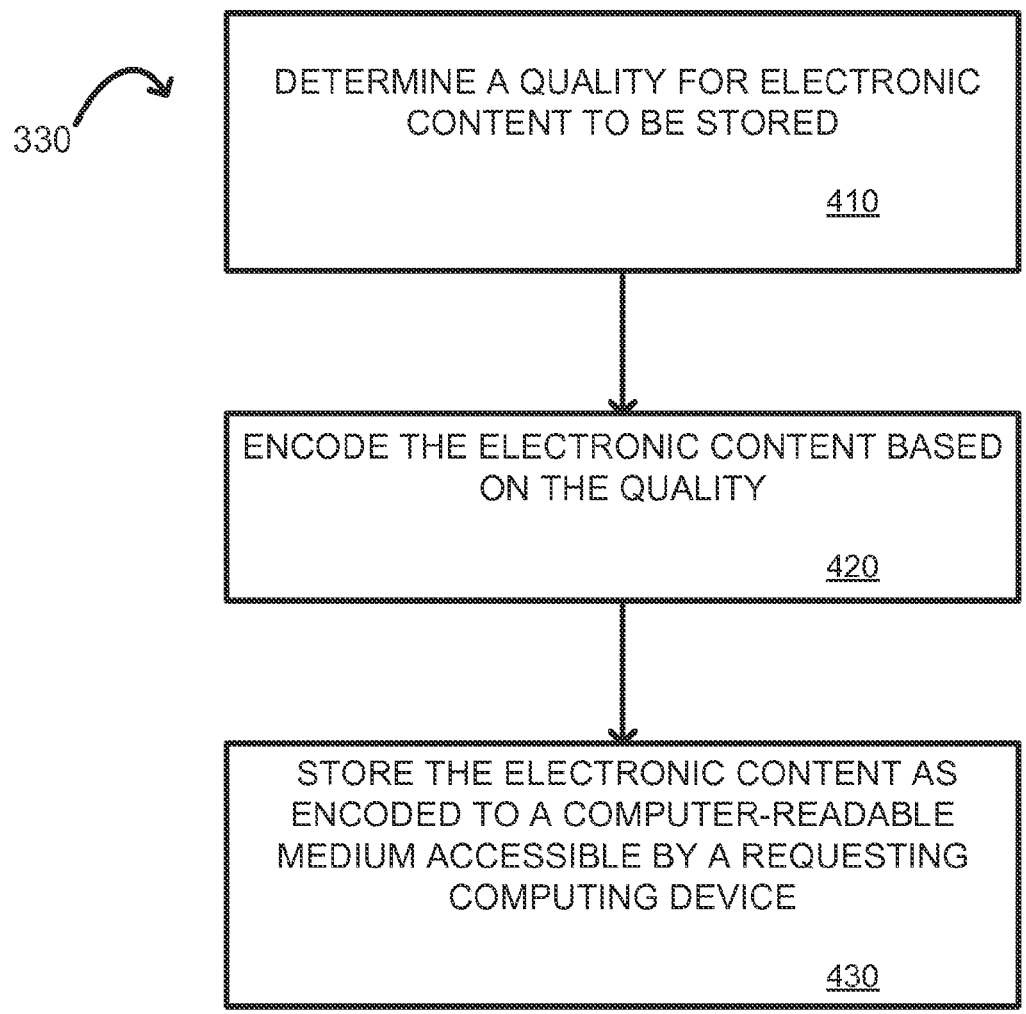
FIG. 4 is a flow chart illustrating an example method for storing electronic content by the network recording service.

Additional details with respect to block 330 are depicted in FIG. 4. FIG. 4 is a flow chart illustrating an example method for storing electronic content 122 by the network recording service. For illustrative purposes, the method is described with reference to the system implementations depicted in FIGS. 1-2. Other implementations, however, are possible.

The recording application 140 can determine a quality for the electronic content 122, as shown in block 310. Determining a quality can include determining an amount of degradation of the electronic content 122b stored by the recording application 140 as compared to the electronic content 122 stored at or accessed by the content provider 104. The quality of electronic content that includes audio and or video content can be determined using criteria such as, but not limited to, the signal-to-noise ratio or peak signal-to-noise ratio between the electronic content 122 stored at or accessed by the content provider 104 and the electronic content 122b stored by the recording application 140.

In additional or alternative embodiments, the recording application 140 can determine the quality based on capability data included in the request 208. The capability data may specify a maximum bandwidth for network connections between the computing device 102 and other computing systems via the network 108. The recording application 140 can determine a quality of the electronic content 122b that can be provided over a network connection having a bandwidth less than or equal to the maximum bandwidth specified in the capability data.

The recording application 140 can encode the electronic content 122b based on the quality, as shown in block 420. Encoding the electronic content 122b can include compressing the electronic content 122b. An amount of compression can be applied to the electronic content 122b such that the electronic content 122b has the quality determined in block 410. Encoding the electronic content 122b can additionally or alternatively include processing the electronic content 122b to be stored in a format specified in the request 208. Examples of such formats can include (but are not limited to), Adobe® Flash® content, an Moving Picture Experts Group ("MPEG") format, etc.

The recording application 140 can store the encoded electronic content 122b to a computer readable medium accessible by the computing device 102, as depicted in block 430.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving, by a recording application executed at a processor on a server, a request to record electronic content, the request received from a client device via a first network connection between the server and the client device, wherein a second network connection between a content provider and the client device is used to provide the electronic content from the content provider to the client device;
   extracting, by the recording application and from the request, a network location for the content provider, authentication information, capability data, and a file format;
   establishing, by the recording application, a third network connection between the server and the content provider at the network location extracted from the request, wherein establishing the third network connection comprises establishing, with the authentication information, that a user of the client device is authorized to access audio and video content from the content provider;
   directing, by the recording application via the third network connection, the content provider to provide, to the recording application over the third network connection, the electronic content and data representing one or more interactions with the electronic content by the client device via the second network connection;
   determining, by the recording application and prior to receiving the electronic content, a maximum bandwidth for communication with the client device and a content quality corresponding to the maximum bandwidth, wherein the maximum bandwidth and the content quality are determined from the capability data;
   receiving, by the recording application and via the third network connection, (i) a first version of the audio and video content of the electronic content authorized for access by the user and (ii) the data representing the one or more interactions, wherein a second version of the audio and video content is delivered to a web browser of the client device via the second network connection, wherein the first version and the second version have different qualities for the audio and video content,
   generating, by the recording application, new electronic content by:
      (i) compressing the first version of the audio and video content, wherein the first version of the audio and video content, as compressed, has the determined content quality, and
      (ii) encoding, in the file format specified by the request, the compressed audio and video content and the data representing the one or more interactions,
   storing, by the recording application, the new electronic content to a computer-readable medium; and
   providing, by the recording application, the client device with access to the new electronic content.

2. The method of claim 1,
   wherein the authentication information identifies the client device, and
   wherein establishing the third network connection comprises transmitting the authentication information to the content provider.

3. The method of claim 1,
   wherein the capability data also indicates that a computing capability of the client device is insufficient to store the electronic content, wherein the computing capability comprises at least one of (i) a capacity of a memory of the client device, (ii) a processing power of a processor of the client device, or (iii) an availability of the processor of the client device, wherein the capability data is generated based on the processor of the client device analyzing capacity of the memory, the processing power of the processor of the client device, and the availability of the processor of the client device.

4. The method of claim 3, wherein the computing capability of the client device is also generated by analyzing a bandwidth of the second network connection between the client device and the content provider.

5. The method of claim 1, further comprising:
   receiving, by the recording application, an additional request to record additional electronic content, the additional request received from an additional client device via a fourth network connection between the server and the additional client device, wherein an additional content provider is communicatively coupled to one or more camera devices remote from the additional client device;
   responsive to receiving the request, establishing a fifth network connection between the server and the additional content provider and directing, via the fifth network connection, the additional content provider to activate the one or more camera devices;
   storing, by the recording application, the additional electronic content provided via the fifth network connection, the additional electronic content stored to the computer-readable medium; and
   providing, by the recording application, the additional client device with access to the additional electronic content stored to the computer-readable medium.

6. The method of claim 1, wherein the third network connection is established between a first network domain at which the server is located and a second network domain at which the content provider is located.

7. The method of claim 6, wherein one or more of the first network connection, the second network connection, and the third network connection is a secured network connection.

8. The method of claim 1,
wherein the different qualities for the audio and video content respectively comprise (i) the first version having an amount of degradation of the audio and video content when stored by the recording application as compared to the audio and video content at the content provider and (ii) the second version having a different amount of degradation of the audio and video content when displayed by the web browser as compared to the audio and video content at the content provider.

9. The method of claim 8, wherein the each of the different qualities for the audio and video content comprises a signal-to-noise ratio or a peak signal-to-noise ratio between (i) the electronic content as stored at or accessed by the content provider and (ii) the electronic content when stored by the recording application or displayed by the web browser, respectively.

10. A non-transitory computer-readable medium embodying program code executable by a computer system, the non-transitory computer-readable medium comprising:
   program code for receiving, by a server, a request to record electronic content, the request received from a client device via a first network connection between the server and the client device, wherein a second network connection between a content provider and the client device is used to provide the electronic content from the content provider to the client device;
   program code for extracting, from the request, a network location for the content provider, authentication information, capability data, and a file format;
   program code for establishing, by the server, a third network connection between the server and the content provider at the network location extracted from the request, wherein establishing the third network connection comprises establishing, with the authentication information, that a user of the client device is authorized to access audio and video content from the content provider;
   program code for directing, by the server via the third network connection, the content provider to provide, to the server over the third network connection, the electronic content and data representing one or more interactions with the electronic content by the client device via the second network connection;
   determining, prior to receiving the electronic content, a maximum bandwidth for communication with the client device and a content quality corresponding to the maximum bandwidth, wherein the maximum bandwidth and the content quality are determined from the capability data;
   program code for receiving, via the third network connection, (i) a first version of the audio and video content of the electronic content authorized for access by the user and (ii) the data representing the one or more interactions, wherein a second version of the audio and video content is delivered to a web browser of the client device via the second network connection, wherein the first version and the second version have different qualities for the audio and video content for the audio and video content;
   program code for generating new electronic content by:
      (i) compressing the first version of the audio and video content, wherein the first version of the audio and video content, as compressed, has the determined content quality, and
      (ii) encoding, in the file format specified by the request, the compressed audio and video content and the data representing the one or more interactions;
   program code for storing, by the server, the new electronic content to a computer-readable medium; and
   program code for providing the client device with access to the new electronic content.

11. The non-transitory computer-readable medium of claim 10,
   wherein the authentication information identifies the client device, and
   wherein the program code for establishing the third network connection comprises program code for transmitting the authentication information to the content provider.

12. The non-transitory computer-readable medium of claim 10, further comprising:
   program code for receiving an additional request to record additional electronic content, the additional request received from an additional client device via a fourth network connection between the server and the additional client device, wherein an additional content provider is communicatively coupled to one or more camera devices remote from the additional client device,
   program code for responding to the request by establishing a fifth network connection between the server and the additional content provider and directing, via the fifth network connection, the additional content provider to activate the one or more camera devices;
   program code for storing the additional electronic content provided via the fifth network connection, the additional electronic content stored to the computer-readable medium; and
   program code for providing the additional client device with access to the additional electronic content stored to the computer-readable medium.

13. The non-transitory computer-readable medium of claim 10, wherein the third network connection is established between a first network domain at which the server is located and a second network domain at which the content provider is located.

14. The non-transitory computer-readable medium of claim 10, wherein the different qualities for the audio and video content respectively comprise (i) the first version having an amount of degradation of the audio and video content when stored by the server as compared to the audio and video content at the content provider and (ii) the second version having a different amount of degradation of the audio and video content when displayed by the web browser as compared to the audio and video content at the content provider.

15. A system comprising:
   a client device configured for:
      generating capability data for the client device based on analyzing (i) a memory capacity of a memory at the client device, (ii) a processing power of a processor at the client device, and (ii) a processor availability of the processor at the client device, and
      transmitting the capability data to a recording server; and
   the recording server having an additional processor configured to execute instructions stored in a non-transitory computer-readable medium providing a recording application;
   wherein the recording application comprises one or more modules configured to perform operations comprising:

receiving a request to record electronic content, the request received from a client device via a first network connection between the recording server and the client device, wherein a second network connection between a content provider and the client device is used to provide the electronic content from the content provider to the client device, extracting, from the request, a network location for the content provider, authentication information, and the capability data, establishing based on the capability data indicating a reduced capability of the client device to record the electronic content as compared to the recording server, a third network connection between the recording server and the content provider at the network location extracted from the request, wherein establishing the third network connection comprises establishing, with the authentication information, that a user of the client device is authorized to access audio and video content from the content provider, directing, via the third network connection, the content provider to provide, to the recording application over the third network connection, data representing one or more interactions with the electronic content by the client device via the second network connection, storing new electronic content comprising (i) audio and video content from the electronic content and (ii) the data representing the one or more interactions received from the content provider via the third network connection, the new electronic content stored to a computer-readable medium, and providing, by the recording application, the client device with access to the new electronic content.

16. The system of claim 15, wherein the authentication information identifies the client device, and wherein the processor is configured by the recording application to establish the third network connection by transmitting the authentication information to the content provider.

17. The system of claim 15, the operations further comprising:

receiving, by the recording application, an additional request to record additional electronic content, the additional request received from an additional client device via a fourth network connection between the recording server and the additional client device, wherein an additional content provider is communicatively coupled to one or more camera devices;

responsive to receiving the request, establishing a fifth network connection between the recording server and the additional content provider and directing the content provider to activate the one or more camera devices;

storing, by the recording application, the additional electronic content provided via the fifth network connection, the additional electronic content stored to the computer-readable medium; and providing, by the recording application, the additional client device with access to the additional electronic content stored to the computer-readable medium.

18. The system of claim 15, wherein the third network connection is established between a first network domain at which the recording server is located and a second network domain at which the content provider is located.

19. The system of claim 15, the operations further comprising:

extracting a file format from the request;

determining, prior to receiving the electronic content, a maximum bandwidth for communication with the client device and a content quality corresponding to the maximum bandwidth, wherein the maximum bandwidth and the content quality are determined from the capability data;

receiving, via the third network connection, (i) a first version of the audio and video content of the electronic content authorized for access by the user and (ii) the data representing the one or more interactions, wherein the client device is configured for receiving a second version of the audio and video content via the second network connection and displaying the second version via a web browser of the client device, wherein the first version and the second version have different qualities for the audio and video content;

generating new electronic content by:
(i) compressing the first version of the audio and video content, wherein the first version of the audio and video content, as compressed, has the determined content quality, and
(ii) encoding, in the file format specified by the request, the compressed audio and video content and the data representing the one or more interactions.

20. The system of claim 19, wherein the different qualities for the audio and video content respectively comprise (i) the first version having an amount of degradation of the audio and video content when stored by the recording application as compared to the audio and video content at the content provider and (ii) the second version having a different amount of degradation of the audio and video content when displayed by the web browser as compared to the audio and video content at the content provider.

* * * * *